United States Patent
Osterhoff et al.

(10) Patent No.: US 10,065,539 B2
(45) Date of Patent: Sep. 4, 2018

(54) MECHANICAL SEAT DUMP ASSEMBLY WITH REMOTE ACTUATOR

(71) Applicant: FORD GLOBAL TECHNOLOGIES, LLC, Dearborn, MI (US)

(72) Inventors: Daniel Jay Osterhoff, Northville, MI (US); Raghavan Narayan Setlur, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 43 days.

(21) Appl. No.: 15/285,188

(22) Filed: Oct. 4, 2016

(65) Prior Publication Data

US 2018/0093591 A1    Apr. 5, 2018

(51) Int. Cl.
*B60N 2/02* (2006.01)
*B60N 2/30* (2006.01)

(52) U.S. Cl.
CPC .................. B60N 2/3011 (2013.01)

(58) Field of Classification Search
CPC ...... B60N 2/3011; B60N 2/3013; B60N 2/30; B60N 2/3002; B60N 2/3004; B60N 2/3009; B60N 2/20; B60N 2/206; B60N 2/2245; B60N 2/433
USPC ............ 297/378.1, 378.11–378.14; 74/500.5
See application file for complete search history.

(56) References Cited

U.S. PATENT DOCUMENTS

| | | | |
|---|---|---|---|
| 5,570,931 A | 11/1996 | Kargilis et al. | |
| 5,597,206 A | 1/1997 | Ainsworth et al. | |
| 6,158,800 A | 12/2000 | Tsuge et al. | |
| 6,523,899 B1 | 2/2003 | Tame | |
| 7,506,931 B2 | 3/2009 | Christopher et al. | |
| 8,113,076 B2 | 2/2012 | Daul | |
| 2013/0001394 A1 | 1/2013 | Calvert | |
| 2013/0113255 A1* | 5/2013 | Glaser | B60N 2/688 297/340 |
| 2013/0285428 A1* | 10/2013 | Livesey | B60N 2/06 297/317 |
| 2014/0138996 A1* | 5/2014 | Kramm | B60N 2/0881 297/344.1 |
| 2014/0191553 A1* | 7/2014 | Blendea | B60N 2/20 297/354.1 |

FOREIGN PATENT DOCUMENTS

| | | |
|---|---|---|
| EP | 2379367 A1 | 10/2011 |
| WO | 2010083607 A1 | 7/2010 |
| WO | 2012145744 A1 | 10/2012 |

OTHER PUBLICATIONS

English Machine Translation of EP2379367A1.

* cited by examiner

*Primary Examiner* — Mark R Wendell
(74) *Attorney, Agent, or Firm* — Vichit Chea; King & Schickli, PLLC

(57) ABSTRACT

A seat dump assembly includes an actuator, a seat dump mechanism remote from the actuator, a mechanical seat adjustment accommodation device, a first cable connecting the actuator to the mechanical seat adjustment accommodation device and a second cable connecting the mechanical seat adjustment accommodation device to the seat dump mechanism.

17 Claims, 6 Drawing Sheets

MECHANICAL SEAT DUMP ASSEMBLY WITH REMOTE ACTUATOR

TECHNICAL FIELD

This document relates generally to the motor vehicle equipment field and, more particularly, to a mechanical seat dump assembly having a remote actuator and a mechanical seat adjustment accommodation device to compensate for fore-aft position adjustment of a motor vehicle seat.

BACKGROUND

Automotive vehicles equipped with second and/or third row seats require actuation of a "dump" latch mechanism to fold the seat backs down across the seat bottoms in order to gain cargo hauling capability. FIG. 1 illustrates a seat back 20 in a regular upright seating position in phantom line and a dumped position in a full line where the seat back lies across the seat bottom 16.

Many motor vehicles of this type require the user to dump each seat individually from each side door sequentially. A remote actuation system is available. However, that remote system utilizes an electro-mechanical device that is actuated from a switch located in the rear of the vehicle and reached through the rear hatch. In second row seats that are mounted on fore/aft track systems, electrical systems are used because cable only systems to date have not been able to function properly in all seating positions. While effective, electrical devices require wiring, switches and can be expensive to produce and are sometimes unreliable.

This document relates to a novel mechanical seat dump assembly that allows a remote actuator to properly dump a seat back of a seat assembly allowing fore/aft adjustment of the seating position no matter what the seating position along the fore/aft track system.

SUMMARY

In accordance with the purposes and benefits described herein, a seat dump assembly is provided. That seat dump assembly comprises an actuator, a fixed track and a carriage displaceable along the fixed track. The seat dump assembly further includes a first cable connecting the actuator to the carriage. A spool is carried on the carriage. The seat dump assembly further includes a seat dump mechanism, in the form of a mechanical latch of a type known in the art, and a second cable connecting the spool to the seat dump mechanism.

The seat dump assembly may further include a spool retainer. In addition the seat dump assembly may further include a first biasing element biasing the carriage into a home position with the spool held in the spool retainer.

In addition, the seat dump assembly may further include a second biasing element eliminating slack and winding the second cable onto the spool. Still further, the seat dump assembly may include a sprocket on the spool and a cooperating lug on the carriage. Manipulation of the actuator may displace the carriage along the fixed track from the home position to a seat dump position wherein the spool is released from the spool retainer and the sprocket engages the lug. This functions to lock the spool against rotation, activate the seat dump mechanism and dump the seat back of the seat assembly.

The fixed track may include a base supporting a first guide element and a second guide element. The first guide element may extend along a first axis while the second guide element extends along a second axis. The first axis may be parallel to the second axis.

The spool retainer may include a first catch and a second catch. The first catch may be provided outboard of the first guide element on the base while the second catch may be provided outboard of the second guide element on the base.

In addition, the carriage may include a first follower receiving the first guide element and a second follower receiving the second guide element. Further, the carriage may include a cradle capturing a first end of the spool and a second end of the spool. The first catch may engage the first end of the spool and the second catch may engage the second end of the spool when the carriage is in the home position.

The seat dump assembly may further include a boss on the fixed track for retaining the first cable. As should be appreciated from the above description, the cooperating sprocket and lug function as a spool locking mechanism.

In accordance with an additional aspect, a seat dump assembly comprises an actuator, a seat dump mechanism remote from the actuator and a mechanical seat adjustment accommodation device. A first cable connects the actuator to the mechanical seat adjustment accommodation device. A second cable connects the mechanical seat adjustment accommodation device to the seat dump mechanism.

In accordance with still another aspect, a method of dumping a seat back by means of the mechanical seat dump assembly is provided. That method comprises the steps of: (a) connecting a remote actuator to a seat dump assembly through a mechanical seat adjustment accommodation device and (b) dumping the seat back in response to manipulation of the remote actuator.

The method may further include the step of displacing a spool of the mechanical seat adjustment accommodation device from a home position to a seat dump position. Further, the method may include the steps of cradling the spool in a carriage, connecting the remote actuator to the carriage by means of a first cable and connecting the spool to the seat dump mechanism by means of a second cable.

In the following description, there are shown and described several preferred embodiments of the seat dump assembly. As it should be realized, the seat dump assembly is capable of other, different embodiments and its several details are capable of modification in various, obvious aspects all without departing from the seat dump mechanism as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seat dump assembly and together with the description serve to explain certain principles thereof. In the drawing figures:

FIG. 1 is a perspective view of a motor vehicle equipped with the seat dump assembly allowing the seat back to be displaced from an upright seating position to a flat cargo hauling or dumped position by means of the operation of an actuator positioned remote from the seat. The seat back is illustrated in the upright seating position in phantom line and the cargo hauling or dumped position in full line.

Reference will now be made in detail to the present preferred embodiments of the seat dump assembly, an example which is illustrated in the accompanying drawing figures.

DETAILED DESCRIPTION

Figure 1:
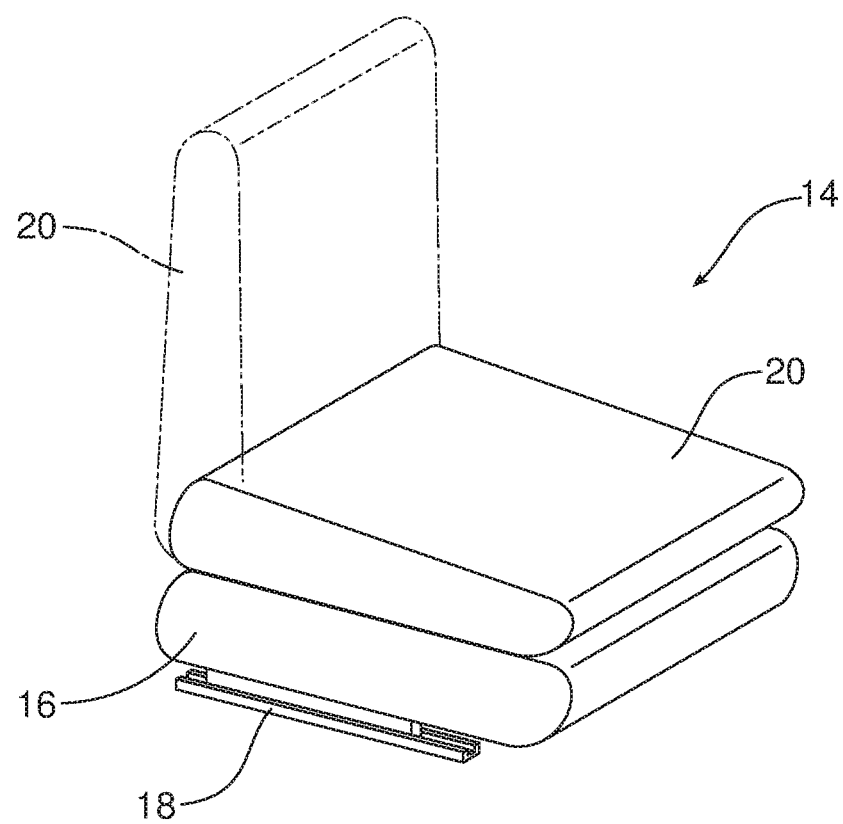

Reference is now made to FIG. 1 illustrating an adjustable seat assembly 14 for a motor vehicle. The adjustable seat assembly 14 comprises a seat bottom 16 allowing for fore/aft adjustment along a guide track 18 and a seat back 20 pivotally connected to the seat bottom. Seat back 20 is displaceable between an upright seating position, illustrated in phantom line in FIG. 1, and a cargo hauling or dumped position illustrated in full line in FIG. 1 wherein the seat back 20 lies flat on top of the seat bottom 16. As will be appreciated from the following description, a seat dump assembly 12 allows one to displace the seat back 20 into the dumped position when the seat assembly 14 is in any fore/aft seating position along the guide track 18 through operation of an actuator 22 located remote from the seat assembly.

Figure 2:
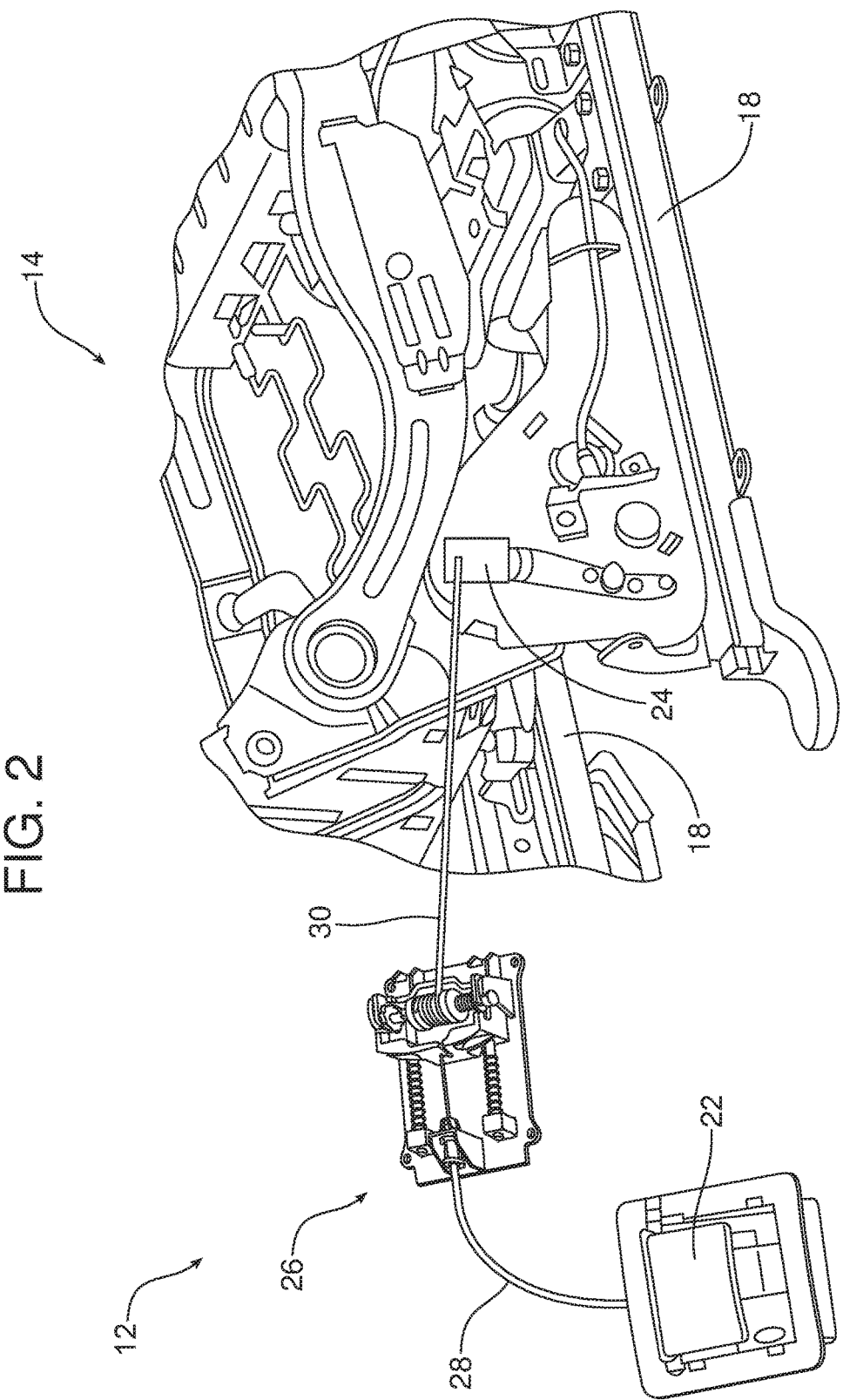
FIG. 2 is a schematic illustration providing an overview of the seat dump assembly.

As illustrated in FIG. 2, the seat dump assembly 12 generally includes the remote actuator 22, a seat dump mechanism 24, comprising a mechanical latch of a type known in the art, carried on the seat assembly 14 and a mechanical seat adjustment accommodation device, generally designated by reference numeral 26.

A first cable 28 connects the actuator 22 with the mechanical seat adjustment accommodation device 26. A second cable 30 connects the mechanical seat adjustment accommodation device 26 to the seat dump mechanism 24. As will become apparent from the following description, the mechanical seat adjustment accommodation device 26 allows the remote actuator 22 to function properly to dump the seat back 20 from the upright position to the dumped position in any position of the seat bottom 16 along the guide track 18.

Figure 3:
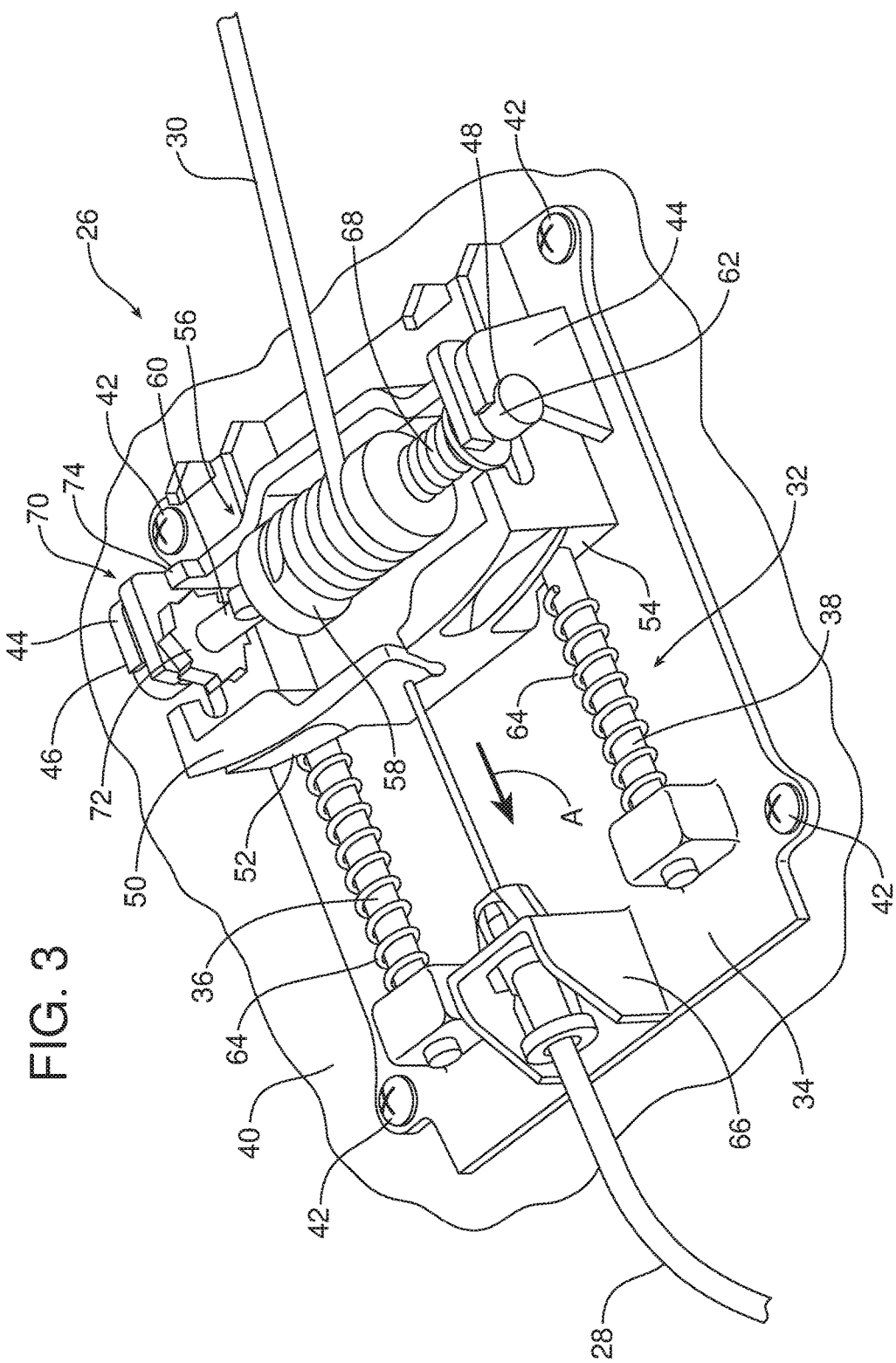
FIG. 3 is a detailed perspective view of the mechanical seat adjustment accommodation device that connects a remote actuator with a seat dump mechanism with that device illustrated in the normal or home position.

Reference is now made to FIG. 3 illustrating the mechanical seat adjustment accommodation device 26 in detail. As shown, the mechanical seat adjustment accommodation device 26 includes a fixed track 32 comprising a base 34 which supports a first guide element 36 and a second guide element 38. In the illustrated embodiment, the first guide element 36 extends along a first axis and the second guide element 38 extends along a second axis wherein the first axis is parallel to the second axis. As further illustrated, the base 34 is fixed to a surface 40 of the motor vehicle by means of the fasteners 42. A spool retainer 44 is carried on the base 34. The spool retainer 44 includes a first catch 46 and a second catch 48. The first catch 46 is outboard of the first guide element 36 while the second catch 48 is outboard of the second guide element 38.

A carriage 50 includes a first follower 52 receiving the first guide element 36 and a second follower 54 receiving a second guide element 38. More specifically, the first follower 52 and second follower 54 allow for free sliding movement of the carriage 50 along the first guide element 36 and second guide element 38. Thus, the carriage 50 is displaceable along the fixed guide track 32 between a home position illustrated in FIG. 3 and a seat dump position illustrated in FIG. 5.

As further illustrated, the carriage 50 includes a cradle 56 for holding a spool 58. More specifically, the cradle 56 captures a first end 60 of the spool 58 at one side of the carriage and a second end 62 of the spool at the other side of the carriage.

A first biasing element 64 biases the carriage 50 into the home position illustrated in FIG. 3. In that home position, the spool 58 is held in the spool retainer 44. More specifically, the first catch 46 engages the first end 60 of the spool 58 while the second catch 48 engages the second end 62 of the spool. A first biasing element 64 biases the carriage 50 into the home position illustrated in FIG. 3. In the illustrated embodiment, the first biasing element 64 comprises two coil springs, one of which is received over the first guide element 36 and the other of which is received over the second guide element 38.

As further illustrated in FIG. 3, a boss 66 is provided on the base 34 of the fixed track 32. The boss 66 functions to retain the first cable 28 which connects the actuator 22 to the carriage 50. The second cable 30 connects the spool 58 with the seat dump mechanism 24. More specifically, a second biasing element 68 eliminates slack and winds the second cable 30 onto the spool 58. In the illustrated embodiment, the second biasing element comprises a torsion spring received over the second end 62 of the spool 58.

Figure 4:
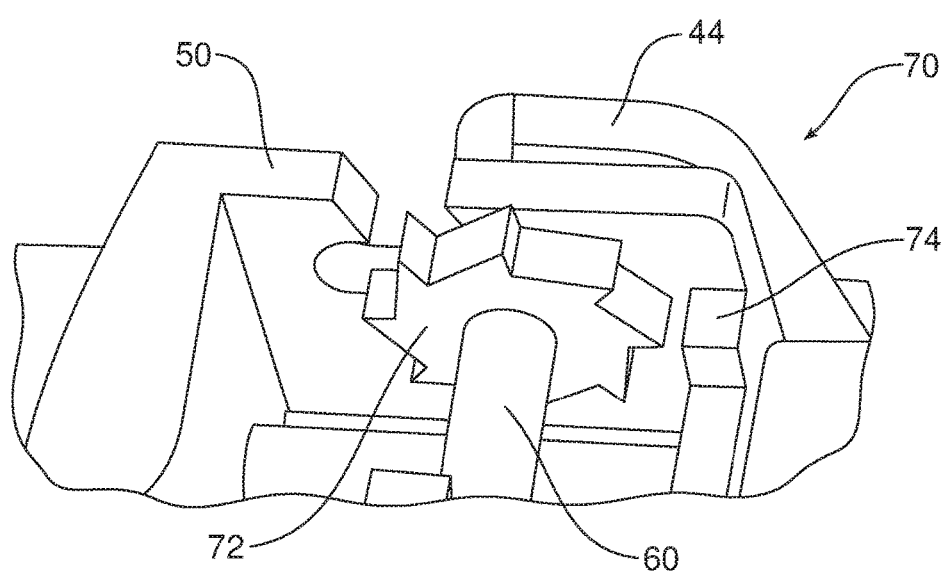
FIG. 4 is a detailed perspective view illustrating the spool locking mechanism comprising a sprocket and cooperating lug shown disengaged when the seat adjustment accommodation device is in the home position shown in FIG. 3.

The mechanical seat adjustment accommodation device 26 also includes a spool locking mechanism, generally designated by reference numeral 70. In the illustrated embodiment, the spool locking mechanism 70 comprises a sprocket 72 on a first end 60 of the spool 58 and a cooperating lug 74 on the carriage 50. As best illustrated in FIGS. 3 and 4, when the carriage 50 is in the home position, the spool 58 is engaged by the spool retainer 44 which functions to prevent the sprocket 72 from engaging the lug 74. Accordingly, in the home position, the spool 58 is free to rotate in the cradle 56 of the carriage 50 to wind the second cable 30 onto the spool 58 and eliminate any slack or to pay out the second cable as necessary thereby accommodating fore and aft movement of the seat bottom 16 along the guide track 18 while maintaining the second cable taut at all times.

Figure 5:
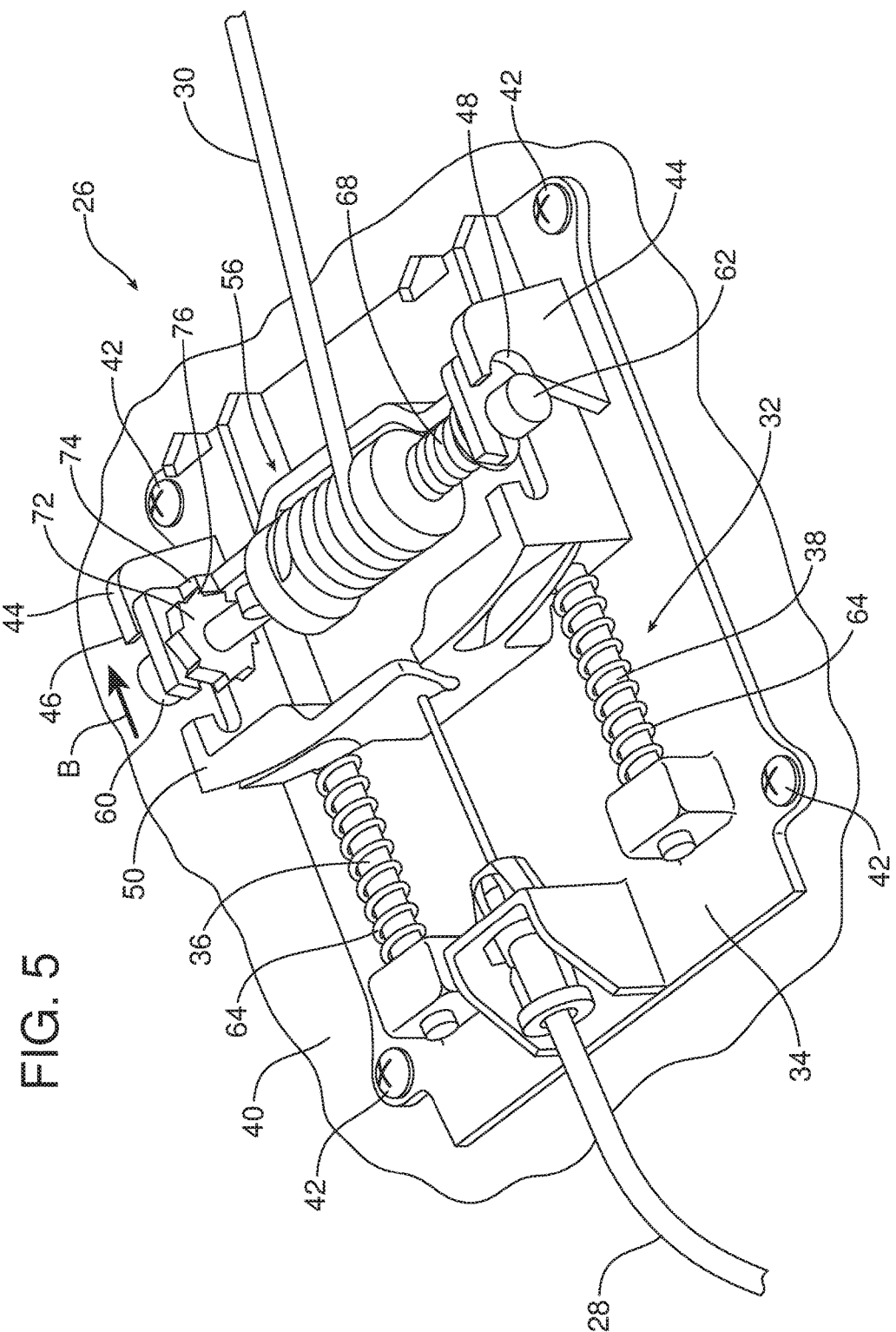
FIG. 5 is a view similar to FIG. 3 but showing the seat adjustment accommodation device in the seat dump position.
Figure 6:
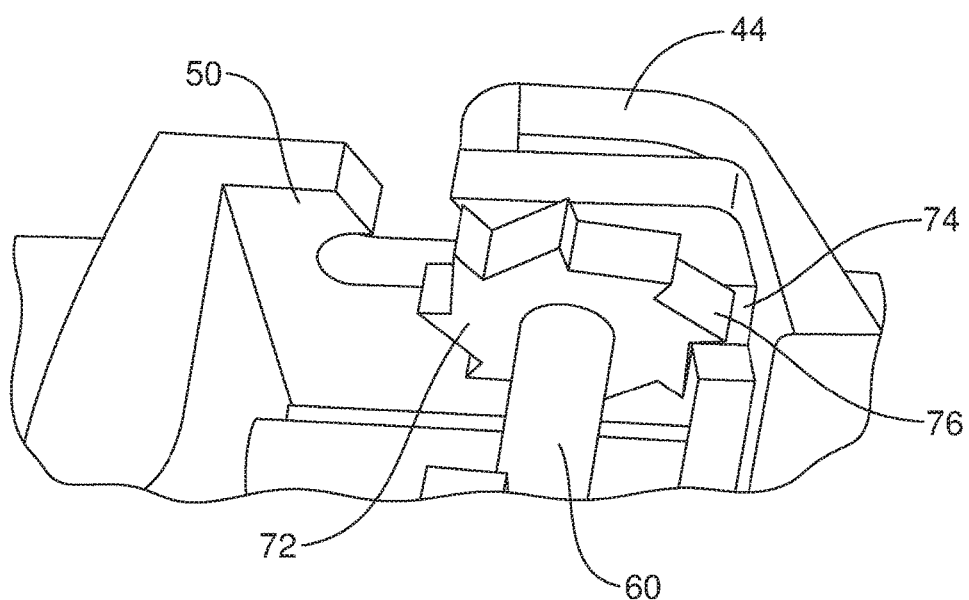
FIG. 6 is a view similar to FIG. 4 but showing the spool locking mechanism with the sprocket engaging the lug when the mechanical seat adjustment accommodation device is in the seat dump position shown in FIG. 5.

In contrast, when the actuator 22 is manipulated, the first cable 28 draws the carriage 50 in the direction of action arrow A thereby displacing the carriage from the home position illustrated in FIG. 3 to the seat dump position illustrated in FIG. 5. As illustrated in FIGS. 5 and 6, when the carriage 50 is in the seat dump position along the fixed track 32, the spool 58 and, more specifically, the spool ends 60, 62 are released from the spool retainer 44. As a result, the spool 58 moves forward in the cradle 56 of the carriage 50 (note action arrow B) so that a tooth 76 of the sprocket 72 engages with the lug 74. This functions to lock the spool 58 against rotation. This in turn transmits a pulling force along the second cable 30 from the mechanical seat adjustment accommodation device 26 and spool 58 to the seat dump mechanism 24, thereby activating the seat dump mechanism to release the seat latch and dump the seat back 20 from the upright position illustrated in phantom line in FIG. 1 to the dumped or cargo carrying position illustrated in full line in FIG. 1.

Once the seat back 16 has been dumped, the operator releases the actuator 22 and the first biasing element 64 returns the actuator as well as the carriage 50 to their home positions.

Consistent with the above description, a method is provided of dumping a seat back 20 of a fore-aft adjustable seating assembly 14 by means of the mechanical seat dump assembly 12. That method comprises the steps of: (a) connecting a remote actuator 22 to a seat dump mechanism 24 through a mechanical seat adjustment accommodation device 26 and (b) dumping the seat back 20 in response to manipulation of the remote actuator.

The method may further include the step of displacing the spool 58 of the mechanical seat adjustment accommodation device 26 from a home position illustrated in FIGS. 3 and 4 to a seat dump position illustrated in FIGS. 5 and 6. Further, the method may include the steps of cradling the spool 58 in the cradle 56 of the carriage 50, connecting the remote actuator 22 to the carriage 50 by means of a first cable 28 and connecting the spool 58 to the seat dump mechanism 24 by means of a second cable 30.

Advantageously, the seat dump assembly 12 is a fully mechanical device that allows the dumping of a seat back 20 of a fore/aft adjustable seat assembly 14 by means of a remote actuator 22. To achieve this end, the seat dump assembly 12 includes a unique mechanical seat adjustable accommodation device 26 described above and illustrated in detail in FIGS. 3-6. Such a fully mechanical seat dump assembly 12 eliminates the need for any electromechanical structures which increase the cost of the seat dump mechanism.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A seat dump assembly, comprising:
an actuator;
a fixed track;
a carriage displaceable along said fixed track;
a first cable connecting said actuator to said carriage;
a spool carried on said carriage;
a spool retainer;
a first biasing element biasing said carriage into a home position with said spool held in said spool retainer;
a seat dump mechanism;
a second cable connecting said spool to said seat dump mechanism; and
a second biasing element eliminating slack and winding said second cable onto said spool.

2. The seat dump assembly of claim 1, further including a sprocket on said spool.

3. The seat dump assembly of claim 2, further including a lug on said carriage.

4. The seat dump assembly of claim 3, wherein manipulation of said actuator displaces said carriage along said fixed track from said home position to a seat dump position wherein said spool is released from said spool retainer and said sprocket engages said lug (a) locking said spool against rotation, (b) activating said seat dump mechanism and (c) dumping a seat back.

5. The seat dump assembly of claim 4, wherein said fixed track includes a base supporting a first guide element and a second guide element.

6. The seat dump assembly of claim 5, wherein said first guide element extends along a first axis and said second guide element extends along a second axis wherein said first axis is parallel to said second axis.

7. The seat dump assembly of claim 6, wherein said spool retainer includes a first catch and a second catch.

8. The seat dump assembly of claim 7, wherein said first catch is outboard said first guide element on said base and said second catch is outboard said second guide element on said base.

9. The seat dump assembly of claim 8, wherein said carriage includes a first follower receiving said first guide element and a second follower receiving said second guide element.

10. The seat dump assembly of claim 9, wherein said carriage includes a cradle capturing a first end of said spool and a second end of said spool.

11. The seat dump assembly of claim 10, wherein said first catch engages said first end of said spool and said second catch engages said second end of said spool when said carriage is in said home position.

12. The seat dump assembly of claim 11, further including a boss on said fixed track retaining said first cable.

13. The seat dump assembly of claim 1, further including a spool locking mechanism.

14. A seat dump assembly, comprising:
an actuator;
a seat dump mechanism remote from said actuator;
a mechanical seat adjustment accommodation device;
a first cable connecting said actuator to said mechanical seat adjustment accommodation device; and
a second cable connecting said mechanical seat adjustment accommodation device to said seat dump mechanism.

15. A method of dumping a seat back by use of a mechanical seat dump assembly, comprising:
connecting a remote actuator to a seat dump mechanism through a mechanical seat adjustment accommodation device; and
dumping the seat back in response to manipulation of said remote actuator.

16. The method of claim 15, further including displacing a spool of said mechanical seat adjustment accommodation device from a home position to a seat dump position.

17. The method of claim 16, further including cradling said spool in a carriage, connecting said remote actuator to said carriage by use of a first cable and connecting said spool to said seat dump mechanism by use of a second cable.

* * * * *